W. E. DESPER.
Water-Meter.
No. 131,604.
Patented Sep. 24, 1872.
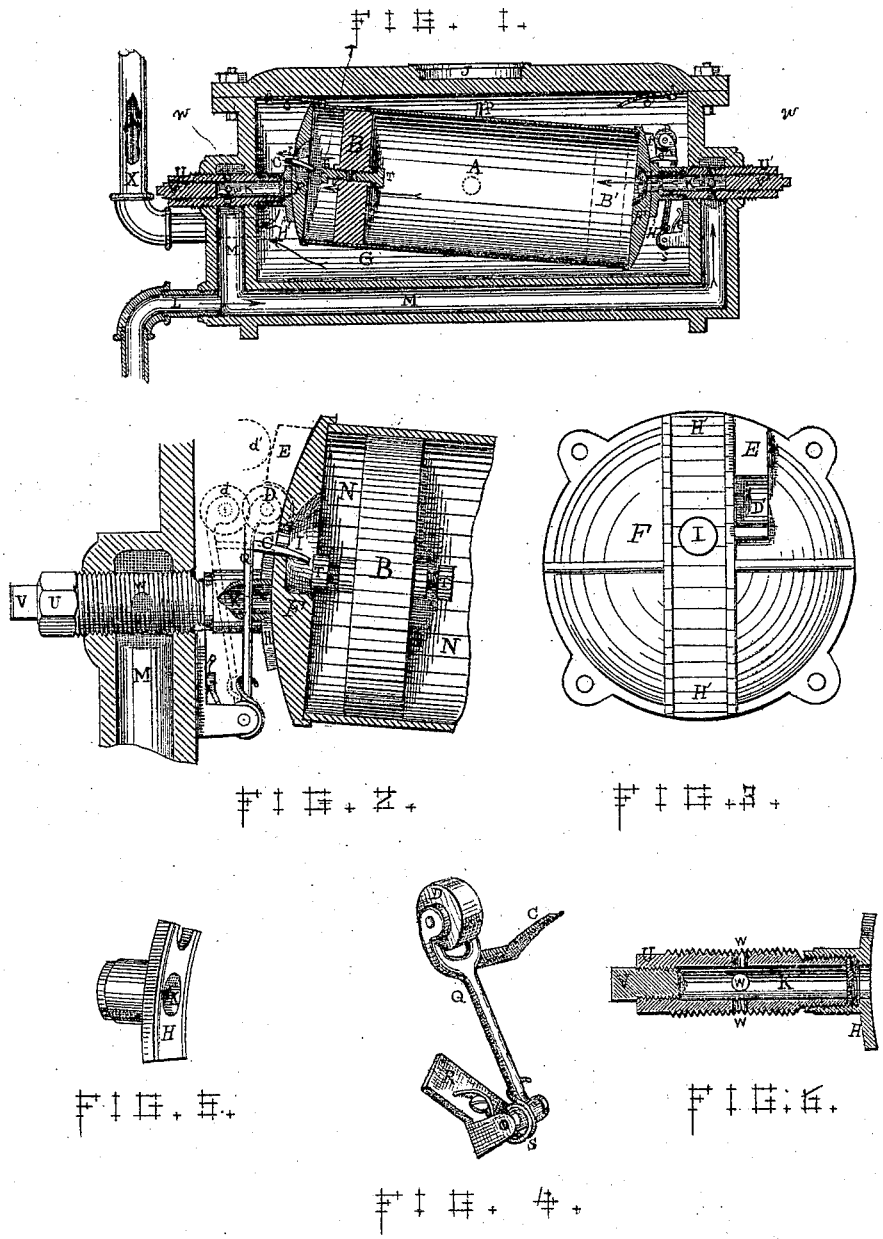
Witnesses.
Wm B. Howe
Gardner Light
Inventor.
William E. Desper

UNITED STATES PATENT OFFICE.

WILLIAM E. DESPER, OF WORCESTER, MASSACHUSETTS.

IMPROVEMENT IN WATER-METERS.

Specification forming part of Letters Patent No. 131,604, dated September 24, 1872.

*To all whom it may concern:*

Be it known that I, WILLIAM E. DESPER, of the city and county of Worcester, State of Massachusetts, have invented certain Improvements in Water-Meters, of which the following is a specification:

My invention relates to that class of meters which measure fluids by their bulk, and whose operation is effected or produced by their flow, or, in other words, are automatic or self-operating. It consists of a horizontal case containing an inner vessel, which oscillates on pivots in such a manner, in connection with its construction, as to bring an aperture in its end to correspond with the proper apertures or positions to fill and discharge itself through the same aperture, and cause a piston sliding in the vessel or cylinder to pass from end to end alternately, each passage filling and discharging the contents of the cylinder minus the size of the piston, and thus measure the quantity accurately by registering the oscillations.

In the drawing, Figure 1 is a central perpendicular longitudinal section of a meter embodying my invention; Fig. 2 is a perpendicular cross-section of the same, showing one end of the cylinder when elevated and its adjacent parts, on a larger scale; Fig. 3 shows the head of the cylinder; and Figs. 4, 5, and 6 are some parts hereinafter more particularly described.

G is a tight chamber or case in which the cylinder N is placed or hung on trunnions at A, so as to balance when the piston B is in its middle. The piston B moves freely in the cylinder, and sufficiently tight to prevent the water from passing by it. L is the pipe leading water into the passage M, which, at each end of the case, communicates, by means of the perforated tubes K K', with the apertures in each end of the cylinder when the latter are brought opposite the tubes. The heads F F' of the cylinder have a curved surface, and the valve H is fitted to the same, the valve being supported on the end of the perforated tube and adjusted to position by a differential screw, or coarse and fine thread on the tube, the coarse part fitting into the case and the fine into the valve H, the perforations $w$ in the tube K admitting the water from the passage M. D is a spring-catch supporting the end of the cylinder when raised by its wheel under the projection E on the cylinder, and having an arm projecting into the opening in the end of the cylinder, as shown in Fig. 2, and against which the gage-screw T is pressed by the piston B, the spring S holding the catch to its work.

In operation, the case or chamber is placed in a horizontal position, and the water introduced at L, and an escape-pipe connected at X. The piston B being at the lower end or B', the water passes into the cylinder through the passage M, as indicated by the arrow, and forces the piston toward the upper end, the water on the other side of the piston passing out into the chamber and off through X, as indicated by the arrows. On the arrival of the piston at the upper end of the cylinder the gage-screw T hits the arm C and throws the catch out from E, leaving that end of the cylinder free to fall, which it does by the weight of the piston B. With the asistance of the spring O in the case, the opposite end of the cylinder, rising, compresses a similar spring, and allows its catch to come into play to hold it in place, the aperture of the cylinder in the rising end passing the induction-valve and opening to the chamber, and that of the falling end passing into position to receive the water at that end, and the piston is again moved toward the other, which is now the upper end. These operations being repeated, the oscillations of the cylinder may be registered by most any of the common ways, and the contents of the cylinder being known and multiplied by the number of oscillations, the result gives the quantity, the gage-screws T T' enabling the piston to be adjusted so as to measure (or hold) an exact quantity, and avoid using fractional numbers and compensate for any wear that may occur.

Having described my invention, what I claim as new, and desire to secure by Letters Patent, is—

1. The combination of the valve H with its adjusting perforated tube K, when constructed and operating substantially as set forth.

2. The water-ways M M, in combination with the perforated tubes and oscillating cylinder, as set forth.

3. The gage-screws, in combination with the piston and the holding mechanism composed of the lever Q, arm C, roll D, and projection E, or their equivalents, constructed and operating in the manner and for the purposes described.

4. The springs O O, in combination with the case and oscillating cylinder, moved by the combined action of the springs and weight of the piston, as set forth.

5. The circular surface, in combination with the adjustable valve H, and the arm C working through an opening in it, when constructed and operating substantially in the manner and for the purposes set forth and described.

WILLIAM E. DESPER.

Witnesses:
ABRAHAM BURLINGAME,
HENRY A. DESPER.